July 19, 1932.   R. T. WISE   1,868,040

CONSTANT MESH GEAR TRANSMISSION CLUTCH

Filed July 17, 1929   2 Sheets-Sheet 1

INVENTOR.
Roy T. Wise.
BY
Townsend, Loftus & Abbett
ATTORNEYS.

July 19, 1932.   R. T. WISE   1,868,040
CONSTANT MESH GEAR TRANSMISSION CLUTCH
Filed July 17, 1929   2 Sheets-Sheet 2
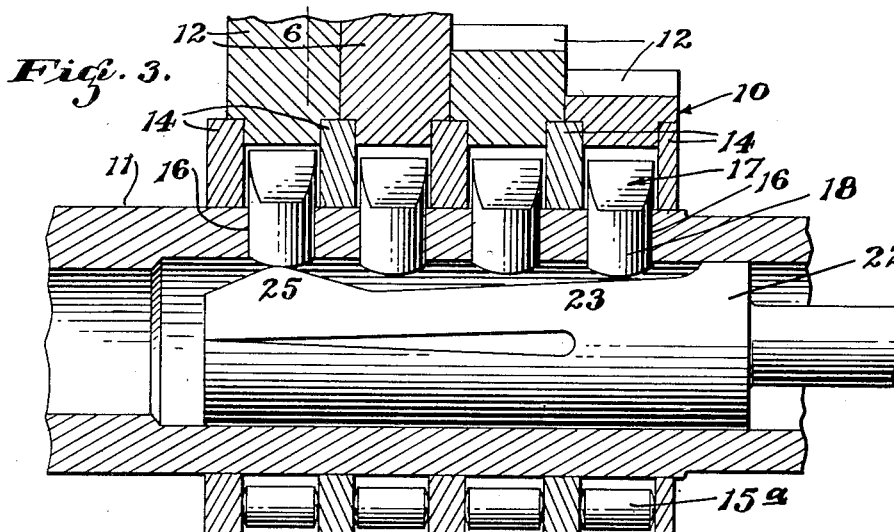
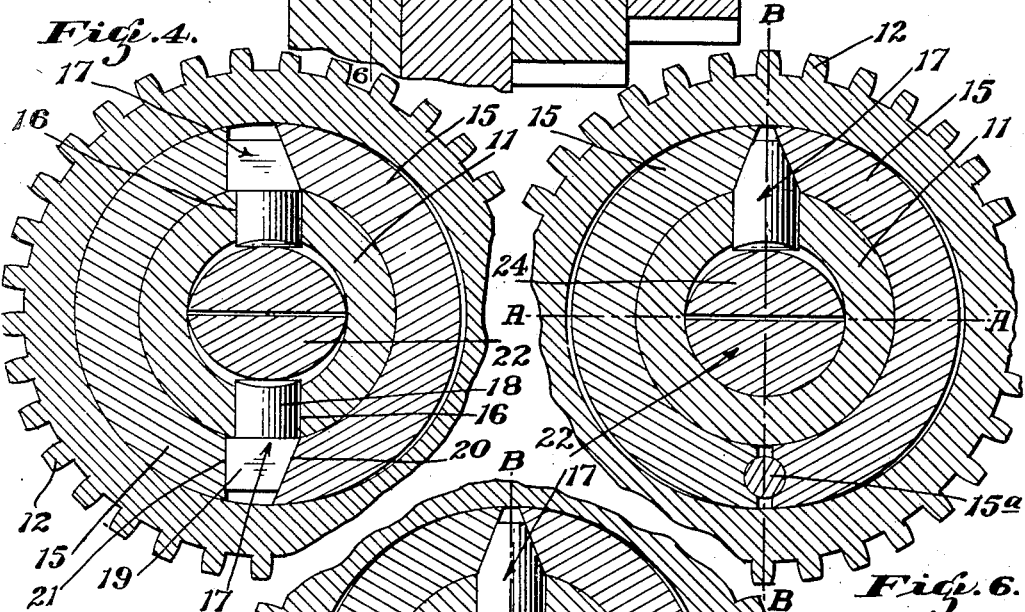
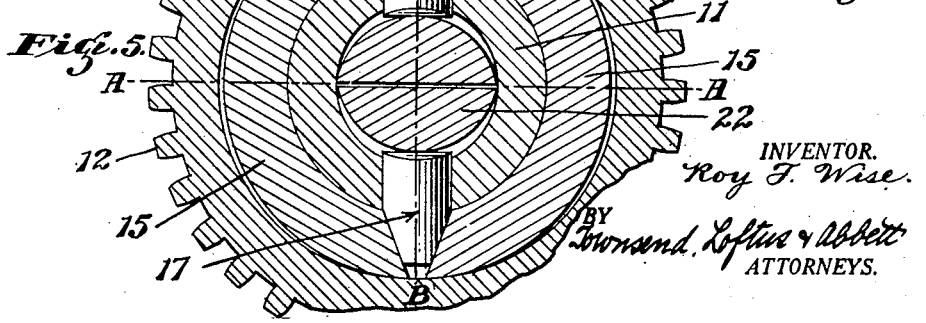
INVENTOR.
Roy T. Wise.
BY Townsend, Loftus & Abbett
ATTORNEYS.

Patented July 19, 1932

1,868,040

UNITED STATES PATENT OFFICE

ROY T. WISE, OF BERKELEY, CALIFORNIA, ASSIGNOR TO WISE PATENT AND DEVELOP-
MENT COMPANY, OF NEW YORK, N. Y., A CORPORATION OF DELAWARE

CONSTANT MESH GEAR TRANSMISSION CLUTCH

Application filed July 17, 1929. Serial No. 378,862.

This invention relates to clutch mechanisms for use in transmissions wherein the gears are in constant mesh and particularly pertains to certain improvements in the device disclosed in my prior application entitled Transmission clutch, filed August 1, 1928, Serial No. 296,659, Patent No. 1,770,290, dated July 8, 1930.

It is the principal object of the present invention to generally improve devices of the character referred to whereby to provide a clutch which may be positively engaged regardless of the relative disposition of the parts to be clutched together and which will form a positive driving engagement between the clutched parts when the clutch is in engagement.

In carrying out this invention into practice the two members to be clutched together are arranged concentrically. The outer member is formed with a bore which is either elliptical in shape or semi-elliptical. Between this bore and the inner member is arranged clutch means which revolve with the inner member and which may normally revolve within said bore but which is capable of being expanded to fit the contour of the bore when the clutch is to be engaged and thereby form a positive driving engagement between the two members.

The invention is exemplified in the following description and illustrated by way of example in the accompanying drawings, in which:

Fig. 3 is a view similar to Fig. 1 showing a slightly modified form of the invention.

Figs. 4 and 5 are transverse sectional views through the type of clutch mechanism shown in Fig. 1, taken on the line 4—4 of Figure 1.

Fig. 6 is a transverse section through the type of clutch shown in Fig. 3, taken on the line 6—6 of Figure 3.

Figure 1:
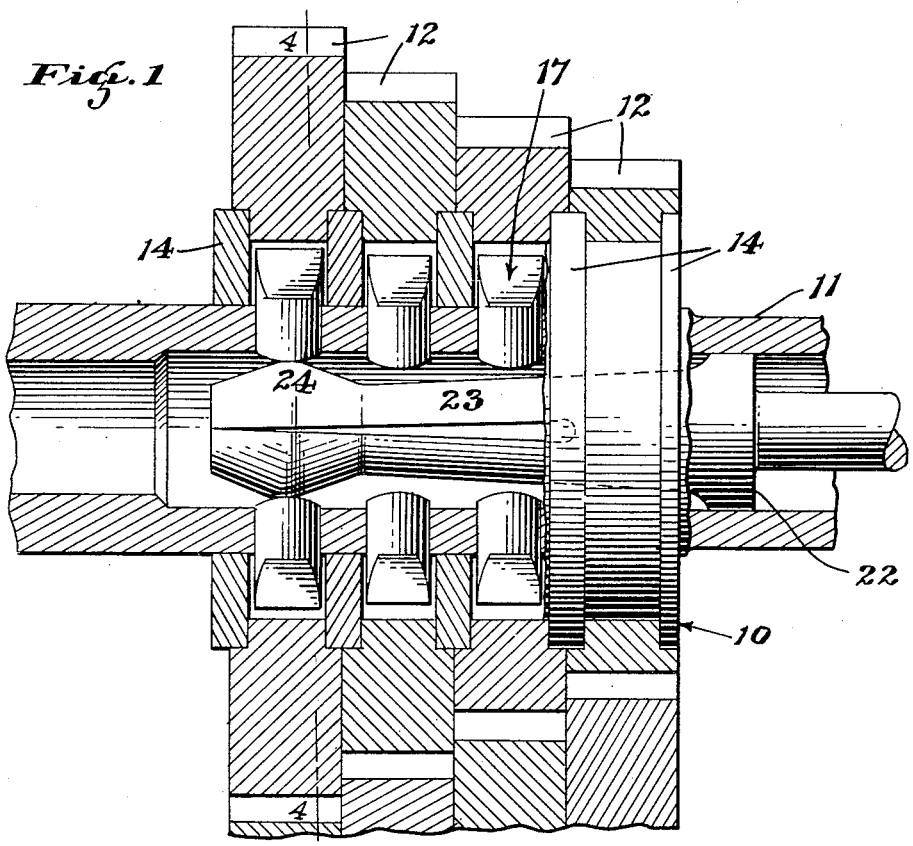
Fig. 1 is a central vertical section through a portion of a transmission showing the application of my improved clutch.
Figure 2:
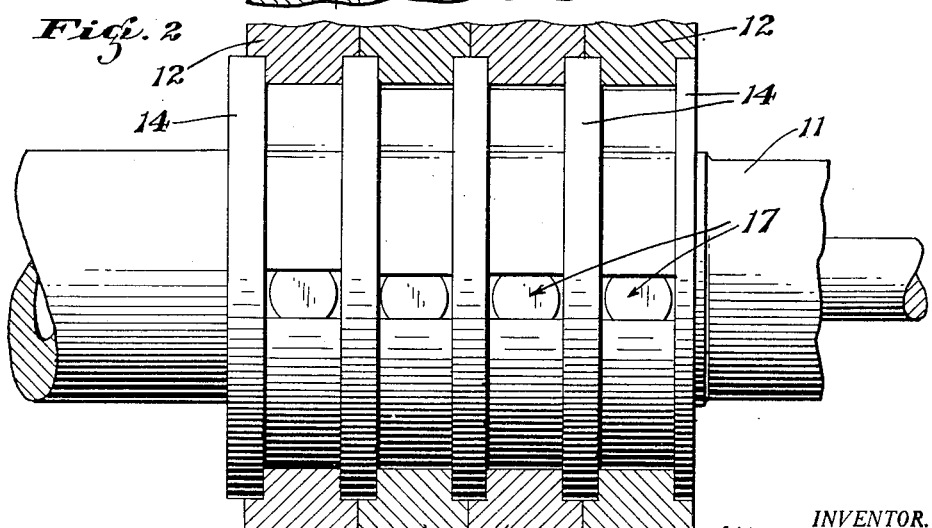
Fig. 2 is a view of a clutch assembly in full with the gears in section.

Referring more particularly to the accompanying drawings, 10 indicates a portion of a constant mesh gear transmission which includes a hollow driving shaft 11 which is adapted to be driven from the prime mover. Arranged on this shaft 11 is a plurality of gears 12 which in the present instance are illustrated as progressively increasing in diameter. These gears 12 are normally revoluble on the shaft 11, being mounted on bearing disks 14 on the shaft 11.

Each gear 12 is fitted with an individual clutch so that a selected gear may be clutched to the shaft 11. It is with this clutch mechanism that the present application is particularly concerned.

In Figs. 4 to 6 inclusive I have shown three forms which my clutch may assume. Each gear 12 is formed with a bore within which semi-circular clutch halves or shoes 15 are arranged. The inner diameter of these clutch halves 15 agrees with the exterior diameter of the shaft 11 while the exterior diameter of the clutch halves or shoes 15 is such that they will normally revolve within the bore of the gear. These clutch halves, however, are operative to form a driving engagement between the gear and the shaft 11.

In the type of device shown in Fig. 4, the right-hand portion of the bore in the gear 12 is slightly elliptical while the left-hand half is concentric with relation to the shaft 11. The exterior diameter of the shoes 15 is likewise concentric to the shaft 11. Therefore, to place the clutch in engagement, one of the shoes 15, which is to a certain extent inherently resilient, is forced into the semi-elliptical half of the bore in the gear so as to form a positive driving engagement between the clutch halves and the gear.

To expand the clutch means 15, the adjacent ends of the shoes are spaced apart and the ends of one shoe are tapered. The spaces between the ends of the clutch shoes or halves 15 form sockets and in alignment with these sockets, which are disposed at diametrically opposite points, the shaft 11 is formed with drilled openings 16, which openings extend radially from the center of the shaft at diametrically opposite points and in alignment with the sockets between the ends of the shoes 15.

Reciprocably disposed in each drilled opening 16 is a clutch element 17 having a cylindrical body portion 18 snugly fitting the drilled opening 16. Exteriorly of the shaft 11 each clutch element 17 is formed with an enlarged head 19 having a tapered face 20 to fit the tapered end face of one of the shoes and a straight face 21 to fit the straight face of the adjacent end of the other shoe. When these clutch elements 17 are in their innermost positions, the shoes 15 will be contracted due to their inherent spring qualities and will be revoluble within the bore of the gear 12. However, when the clutch elements 17 are projected outwardly, the shoes 15 will be expanded and one of them will be expanded into the semi-elliptical portion of the bore in the gear 12 and therefore a positive driving engagement will be effected between the shaft 11 and the gear 12.

To move the clutch elements 17 outwardly, I provide a clutch operating member 22 (see Fig. 1) which is reciprocably disposed within the bore of the shaft 11. This clutch operating member 22 is formed with a portion 23 which is reduced in diameter so that when aligned with the clutch elements 17 enables the latter to assume positions releasing the shoes 15 from driving engagement with the gear 12.

The operating member 23 is formed with a cam end 24 which is adapted to be placed in register with the clutch elements of a selected gear or clutch and with such register the clutch elements are moved outwardly and cause expansion of the shoes 15 to place the clutch in engagement and clutch the selected gear 12 to the shaft 11.

It will be noticed that the end of the clutch operating member 22 is longitudinally slotted so that it will yield a certain amount. This enables the shoes to properly align within the bore of the gear 12 when the clutch member is first moved to operating position. As soon as the clutch shoes or members 15 properly align with the bore, the clutch elements 17 are moved to the full distance outwardly and at this time the cam 24 of the clutch operating member 22 is fully contracted and prevents any contraction of the clutch shoes 15 and maintains the clutch shoes 15 in positive engagement with the bore of the gear 12.

In Fig. 5 the clutch there disclosed is similar to that shown in Fig. 4 with the exception that the bore in the gear 12 is fully elliptical and the exterior diameter of the clutch shoes 15 is just slightly less than the minor axis of the bore which is along the line B—B. The major axis of the elliptical bore is along the line A—A. The ends of both of the shoes are tapered and the outer ends of the clutch elements 17 are tapered to coincide therewith. Therefore, when the cam end 24 of the clutch operating member 22 engages the clutch elements 17 and moves them outwardly both shoes will be expanded until they coincide with the elliptical shape of the bore, forming a positive driving engagement between the shaft 11 and the gear 12.

In Fig. 6 but one clutch element 17 is employed. At the opposite side of this clutch element the clutch members or shoes 15 are adapted to pivot about a pivot pin 15a. Therefore, the cam 24 of the clutch operating member 22 merely moves the one clutch element 17 outwardly and causes expansion or distortion of the shoes 15 until they coincide with the bore in the gear 12.

In operation of one clutch here disclosed, as the cam 24 is moved into register with the clutch elements 17 these elements are yieldably pressed outwardly until the shoes coincide with the bore in the gear 12, at which time the cam end 24 will no longer be compressible, which will cause the shoes to be positively held to form a positive driving engagement between the shaft 11 and the selected gear. When the cam end 24 is moved from alignment with the clutch elements 17, the inherent spring qualities of the shoes 15 will cause them to assume their normal non-engaging positions.

It is obvious from the foregoing that in the present clutch friction is not depended upon to form the driving engagement between the parts but the parts are positively clutched together.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A clutch of the character described comprising an inner and an outer member adapted to revolve concentrically, the outer member being formed with a bore having a slightly eccentric portion, clutch means arranged within this bore and adapted to be driven by the inner member, said clutch means normally revolving within the bore, and a resilient actuator rod for moving the clutch means into driving engagement with the outer member and arranged to assume a yielding and non-yielding position, said resilient actuator rod being contracted to its non-yielding position when the clutch means is in operative engagement with the outer member to provide a positive driving engagement between the inner and outer members and automatically take up wear between the parts.

2. A clutch comprising an inner member, an outer member, said members being adapted to revolve concentrically, said outer member being formed with an elliptical bore, clutch means adapted to be constantly driven by the inner member and normally capable of revolving within the bore of the outer member, said clutch means being capable of distortion to agree with the entire elliptical contour of the bore whereby to form a positive driving engagement between the inner and outer member, and means for operating the clutch, a resilient actuator rod, said actuator rod arranged to be contracted to a non-yielding position when the clutch is engaged.

3. A clutch comprising an inner member, an outer member, said members being adapted to revolve concentrically, said outer member being formed with a bore with one portion thereof being eccentric and disposed further radially from the center of revolution than the remainder of the bore, a clutch member arranged within the bore and driven by the inner member and normally revoluble within the smallest radius of said bore, said clutch member being capable of operation to engage the eccentric portion of the bore and thereby form a positive driving engagement between the two members, and a resiliently yieldable rod adapted for yielding engagement with said clutch member to operate the same, said rod arranged to be contracted to a non-yielding position when the clutch member is operatively connected to the outer member.

4. A clutch comprising an inner member, an outer member, said members being adapted to revolve concentrically, said outer member being formed with a bore with one portion thereof being eccentric and disposed further radially from the center of revolution than the remainder of the bore, a segmental member driven by the inner member and arranged within the bore and normally revoluble within the smallest radius of said bore, said segmental member being capable of distortion or expansion to agree with the eccentric portion of the bore and thereby form a positive driving engagement between the two members, and a clutch actuating rod slotted to render it resiliently yieldable operatively associated with said segmental member and operative to cause said member to yieldingly move into engagement with the eccentric portion of the bore, said clutch actuating rod assuming a non-yielding position when the segmental member is expanded into engagement with the bore.

5. A clutch comprising an inner member, an outer member, said members being adapted to revolve concentrically, said outer member being formed with an elliptical bore, clutch means arranged in the bore and interposed between the outer member and the inner member, said clutch means being driven by the inner member and normally revoluble within the bore, said clutch means being capable of expansion to agree with the major axis of the bore and thereby form a driving engagement between the inner member and the outer member, and a yieldable cam for yieldingly expanding said clutch means, said yieldable cam assuming a non-yielding position when the clutch means is expanded into engagement with the bore.

6. A clutch comprising an inner and an outer member adapted to revolve concentrically, said outer member being formed with an elliptical bore, a pair of segmental clutch members arranged within the bore and intermediate the inner and outer members, said segmental clutch members being driven by the inner member and normally revoluble within the bore, radially movable wedge means for expanding said segmental members to agree with the contour of the elliptical bore throughout a major portion of the circumference of the bore whereby to form a driving engagement between the inner and outer members, and a yieldable cam engaging said wedge means for yieldingly moving the same, said yieldable cam assuming a non-yielding position when the wedge means is moved to expand the segmental member into engagement with the bore.

7. A clutch comprising an inner member, an outer member, said outer member being formed with a bore, one-half thereof being semi-elliptical and the other half being semi-circular, a pair of clutch members arranged within the bore intermediate the inner and outer members, one of said clutch members being inherently resilient for distortion into engagement with the semi-elliptic portion of said bore, said clutch members being driven by the inner member and normally revoluble in the bore, and yieldable means for expanding said clutch members to place their outer circumference in contact with the circumference of the bore throughout substantially the entire circumference thereof whereby to form a driving engagement between the inner and outer members.

8. A friction clutch comprising inner and outer members adapted to revolve concentrically, the outer member being formed with a bore having an eccentric portion, clutch actuating means, clutch means arranged within said bore for clutching said inner and outer members and including means for diminishing the transmission of torque stresses to said actuating means, and said actuating means having a portion thereof removed to render a remaining portion thereof normally inherently yieldable and arranged to be contracted to a non-yielding position when the clutch is engaged.

9. A friction clutch comprising inner and outer members adapted to revolve concentrically, the outer member being formed with a bore having an eccentric portion, clutch actuating means, clutch means arranged within said bore for clutching said inner and outer members and including means for diminishing the transmission of torque stresses to said actuating means, and said actuating means being slotted to render it normally yieldable and arranged to be contracted to a non-yielding position when the clutch means operatively connects the inner and outer members.

10. A friction clutch comprising inner and outer members adapted to revolve concentrically, the outer member being formed with a bore having an eccentric portion, clutch actuating means, clutch means arranged within said bore for clutching said inner and outer members and including means for diminishing the transmission of torque stresses to said actuating means, and said clutch actuating means including a pair of resilient yieldable arms adapted to unyieldingly abut each other when the clutch is engaged to provide a positive driving connection between the inner and outer members and automatically take up wear between the parts.

11. A friction clutch comprising inner and outer members adapted to revolve concentrically, the outer member being formed with a bore having an eccentric portion, a clutch actuating rod, clutch means arranged within said bore for clutching said inner and outer members and including means for diminishing the transmission of torque stresses to said actuating rod, and said actuating rod being longitudinally slotted to provide a resilient yieldable arm adapted to abut the rod to limit its yielding action when the clutch is engaged whereby to provide a positive driving engagement between the inner and outer members and automatically take up wear between the parts.

12. A clutch comprising a hollow shaft, a member arranged thereon to revolve concentrically therewith, said member being formed with a bore having an eccentric portion, clutch shoes disposed within the member around the shaft, the spaces between the shoes forming sockets converging outwardly, clutch elements projecting radially from the shaft and having tapered ends fitting the sockets, said elements being movable radially of the shaft and adapted upon outward movement to expand said shoes to conform with the eccentric contour of the bore to form a positive driving engagement between the shaft and member, and a sliding clutch actuating rod in said shaft having a cam portion slotted to render it yieldable, said cam portion arranged to be contracted to a non-yielding position when the clutch is engaged.

13. A clutch comprising a hollow shaft, a member arranged thereon to revolve concentrically therewith, said member being formed with a bore having an eccentric portion, clutch shoes disposed within the member around the shaft, the spaces between the shoes forming sockets converging outwardly, clutch elements projecting radially from the shaft and having tapered ends fitting the sockets, said elements being movable radially of the shaft and adapted upon outward movement to expand said shoes to conform with the eccentric contour of the bore to form a positive driving engagement between the shaft and member, and a sliding clutch actuating rod mounted in said hollow shaft and being longitudinally slotted to provide the same with a resilient yieldable arm adapted when contracted to abut unyieldingly the rod whereby to provide a positive driving engagement between the parts and automatically take up wear when the clutch is engaged.

14. A clutch comprising inner and outer members adapted to revolve concentrically, said outer member being formed with a bore, one-half thereof being semi-elliptical and the other half semi-circular, a pair of semi-circular clutch shoes arranged within the bore intermediate the inner and outer members, the adjacent ends of said shoes being spaced apart, the end of one shoe being beveled and the adjacent end of the other shoe being disposed substantially radially, a radially movable clutch element having a tapered end fitting between said clutch shoes and provided with faces corresponding to the ends of said shoes, and means for moving said radially movable element.

15. A clutch of the character described comprising inner and outer members adapted to revolve concentrically, the outer member being formed with a bore having an eccentric portion, clutch shoes disposed within the outer member and adapted for frictional contact with the bore, the spaces between the shoes forming a socket converging outwardly, a radially movable clutch element having a tapered end fitting said socket, said tapered end having an inclined face engaging one of said shoes and a substantially radially disposed plain face engaging the other of said shoes, a resilient actuator rod for moving the clutch means into driving engagement with the outer member and arranged to assume a yielding position and an unyielding position, said resilient actuator rod being contracted to its non-yielding position when the clutch means is in operative engagement with the outer member to provide a positive driving engagement between the inner and outer members and automatically take up wear between the parts.

ROY T. WISE.